United States Patent [19]

Emory, Jr. et al.

[11] E Re. 30,160

[45] Reissued Nov. 27, 1979

[54] SMOKE REDUCTION COMBUSTION CHAMBER

[75] Inventors: John M. G. Emory, Jr., Vernon; Joseph J. Faitani, Hartford, both of Conn.

[73] Assignee: United Technologies Corporation, Hartford, Conn.

[21] Appl. No.: 912,891

[22] Filed: Jun. 5, 1978

Related U.S. Patent Documents

Reissue of:

[64] Patent No.: 3,643,430
Issued: Feb. 22, 1972
Appl. No.: 16,527
Filed: Mar. 4, 1970

[51] Int. Cl.[2] ..... F02C 7/00
[52] U.S. Cl. ..... 60/39.65; 60/39.74 R
[58] Field of Search ..... 60/39.65, 39.74 R

[56] References Cited

U.S. PATENT DOCUMENTS

| | | | |
|---|---|---|---|
| 2,609,663 | 9/1952 | Newcomb | 60/39.65 |
| 3,099,134 | 7/1963 | Calder et al. | 60/39.65 |
| 3,134,229 | 5/1964 | Johnson | 60/39.65 |
| 3,394,543 | 7/1968 | Slattery | 60/39.65 |
| 3,498,055 | 3/1970 | Faintani | 60/39.65 |

FOREIGN PATENT DOCUMENTS

| | | | |
|---|---|---|---|
| 836117 | 6/1960 | United Kingdom | 60/39.65 |

*Primary Examiner*—Robert E. Garrett
*Attorney, Agent, or Firm*—Norman Friedland

[57] ABSTRACT

A combustion chamber either an annular or can-annular type, which substantially eliminates the production of smoke while maintaining all other performance parameters of the combustion chamber. The combustion chamber is provided with a front end configuration which substantially eliminates local fuel rich regions and which provides a means for mixing the incoming fuel and air.

6 Claims, 2 Drawing Figures

SMOKE REDUCTION COMBUSTION CHAMBER

Matter enclosed in heavy brackets [ ] appears in the original patent but forms no part of this reissue specification; matter printed in italics indicates the additions made by reissue.

The invention herein described was made in the course of or under a contract with the Department of the Navy.

BACKGROUND OF THE INVENTION

The present invention relates to combustion chambers and more particularly to any type combustion chamber for a gas turbine engine, the construction of the combustion chamber being such that the fuel-air mixture is combusted in such a manner that the formation of carbon, and hence visible smoke emission is markedly reduced. This smoke reduction is accomplished while maintaining all other combustion chamber performance parameters, such as combustion efficiency, combustion stability, altitude ignition, and durability.

As background, it is well known that a combustion chamber for use in a gas turbine must possess certain characteristics in order to satisfactorily perform its function, and this is particularly true of a gas turbine engine employed in a jet aircraft. The combustion chamber must be capable of easy startup at ground level through a range of ambient air temperatures representing cold and hot weather conditions, that is, low fuel flows and short ignition delay time so as not to result in an explosive or hot start. In the case of a can-annular type burner which will be the type burner primarily discussed herein, after ignition of the fuel-air mixture in the burners that are equipped with spark igniters or some other ignition source, the flame must propagate to adjacent burners for a full lightoff and then accelerate to idle speed. The combustor must also have the capability of good stability limits, that is, operate satisfactorily at fuel-air ratios below and above the normal idle and rated thrust fuel-air ratios in order to insure that during transient conditions, such as acceleration and deceleration operational modes which can result in off-design fuel-air ratio levels, the burners will not flame out. An additional characteristic that the combustion chamber must have is that it must be capable of altitude ignition over a wide flight speed and altitude range without causing compressor stall or other penalties which would prevent the engine from being brought up to idle speed. Additionally, the combustion chamber, after reaching idle speed, must have the capability of being accelerated to higher power settings, and this must be accomplished in a relatively short time, normally within seconds. The combustion chamber must also have the capability of producing a satisfactory discharge temperature pattern or be capable of alteration to result in such a pattern without detrimental effect of the previously mentioned performance parameters, in order to achieve long life of parts receiving the hot discharge gases from the burner. Finally, the combustion chamber must provide an atmosphere of combustion wherein the fuel-air mixture when combusted does not result in the emission of visible smoke from the engine.

While many of the elements employed in the present invention are described in the prior art, for example, the Johnson patent, U.S. Pat. No. 3,134,229, the Schiefer patent, U.S. Pat. No. 2,974,485, the Panko patent, U.S. Pat. No. 3,352,106 and the Bachle patent, U.S. Pat. No. 3,018,625, it is pointed out that none of these particular references or the prior art in general solves the particular problem as the present invention does. As hereinbefore noted, in order to provide an acceptable combustion chamber for use in a gas turbine engine, it is necessary to maintain the performance parameters hereinbefore mentioned. Smoke emission has been a problem which the prior art combustion chamber constructions have accepted so as not to penalize or adversely affect these performance parameters. The present invention does not accept smoke emission and substantially eliminates smoke emission without any penalty to the performance parameters hereinbefore mentioned.

SUMMARY OF THE INVENTION

It is a primary object of the present invention to provide a combustion chamber which substantially eliminates smoke emission therefrom and which provides a combustion chamber which maintains the overall performance parameters which are acceptable for use in a gas turbine engine.

In general, the present day prior art gas turbine combustion chambers operate at lean overall fuel-air ratios, which are below the flammability limits of most normally used fuels. Therefore, in order to burn the incoming fuel and air, a region in the burner must be provided in which the fuel is mixed with the correct portion of air in order to initiate and sustain combustion over a wide range of operating conditions. This is normally done by controlling the airflow distribution into the burner as a function of burner length. Incoming air is therefore divided into primary air and secondary air, and the manner of injection, location and amount of primary air used, in large part, controls the smoke formation characteristics of a combustion chamber and is the main object of this invention. It is a main objective of this invention to control this effect.

As hereinbefore stated, a combustion chamber for a jet engine used in aircraft propulsion must possess acceptable stability and altitude ignition characteristics. Normally, in prior art combustion chambers, this is accomplished by setting up a zone of recirculation in the front end of the burner in which all of the fuel is mixed with only a portion of the total airflow. This zone is one of low axial velocity, and the large stable recirculation eddies formed in this region result in excellent burner performance in the aforementioned parameters, except that it is prone to producing excessive carbon and hence results in a highly visible exhaust. It is equally well known that carbon is formed in rich fuel mixtures; hence, the problem is one of lack of oxygen and intimate mixing of fuel and air in the front end and other local regions. It has been determined that to obtain a satisfactory reduction in smoke, increasing the airflow proportion in the front end is effective but that the amount required invariably severely compromises the stability and altitude relight capability. The present invention determines and provides a construction to reduce smoke while at the same time maintaining the necessary performance parameters which are acceptable for use in a gas turbine engine.

The present invention accomplishes the foregoing by a unique combustion chamber configuration. In the combustion chamber of the present invention a plurality of air tubes are provided at the closed end of the combustion liner. The size, number and location of these air tubes are optimized so as to provide a critical airflow into the combustion zone or zones of the combustion liner. The amount of air injected through these air tubes in the front of the combustion chamber is critical, it being necessary that the air tubes be sized so that they permit the passage of air therethrough to be a predetermined percentage of the total primary airflow which will lie in a range where the air tube sizing starts to get too large and permit flame "blowout" to where the air tube sizing starts to get too small and permit excessive smoking. In a combustion chamber configuration tested, the amount of air to be injected through these air tubes was computed and figured to be from 6–8 percent of the total [primary] airflow. This range will vary for other combustion chambers of different configurations.

As has been hereinbefore noted, the location of the air tubes is critical. To this end, in the embodiment illustrated, air tubes are positioned at the inner and outer walls of the dome-shaped closure member. The tubes on the inner wall are axially offset from the tubes on the outer wall, the tubes on the outer wall being positioned further downstream than the tubes on the inner wall. Additionally, these tubes are directed internally from the walls so that the air discharging therefrom penetrates any air entering through the liner front end and it further acts to counteract this air from dispersing or deflecting the incoming air.

DESCRIPTION OF THE PREFERRED EMBODIMENT

The invention is shown in a diffuser case 10 which is intended to be located between the compressor and the turbine of a gas turbine powerplant. A powerplant to which this type of combustion chamber is applicable is disclosed, for example, in the Savin patent, U.S. Pat. No. 2,747,367.

Figure 1:
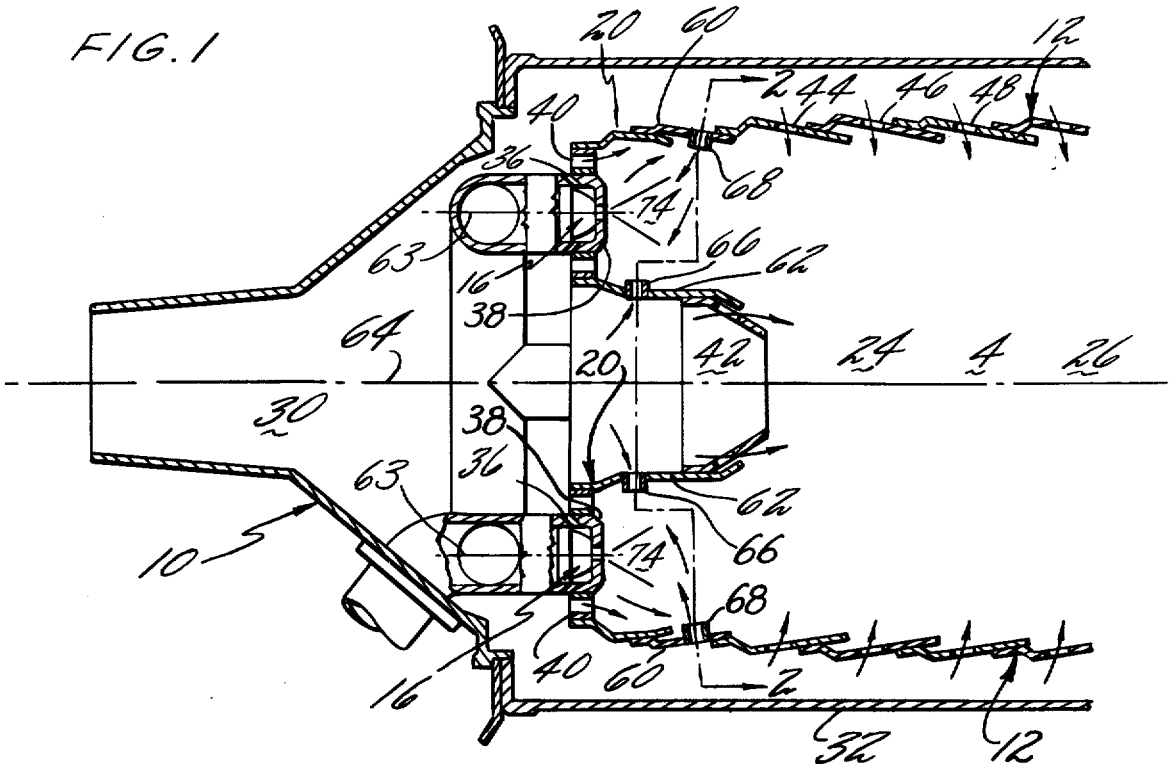
FIG. 1 is a cross-sectional view of the liner within a combustion section envelope showing the device of the invention.
Figure 2:
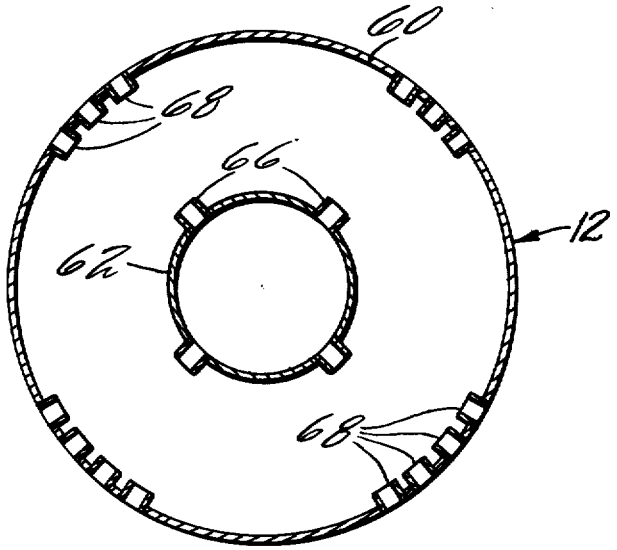
FIG. 2 is a cross-sectional view taken substantially along line 2—2 of FIG. 1.

As is shown in FIGS. 1 and 2, the combustion chamber is of a can-annular type, only one being illustrated. It is to be understood that any type combustion chamber may be employed, whether it be a can-annular type or an annular type. Again referring to FIGS. 1 and 2, combustion chamber 4 consists of outer liner wall 12, inner liner wall 62, and annular dome-shaped member 20 with fuel nozzles 16. Liner walls 12 and 62 along with annular dome-shaped member 20 are the closure parts of combustion chamber 4. The combustion chamber 4 includes an upstream end where the primary combustion zone occurs, this combustion zone being designated by the numeral 24 and an open end 26 wherein the exhaust gases are discharged to a turbine not shown herein.

As shown, high-pressure compressor discharge air 30 enters the diffuser case 10 and flows toward the head end or the upstream end of the combustion chamber 4. As illustrated, combustion chamber 4 is supported from the combustion case 32 by any conventional means. The compressor discharge air divides itself around combustion chamber 4, entering through holes or openings 36 of the fuel nozzle shrouds 38, burner can swirlers 40, central opening 42 and a series of openings 44, 46 and 48 which are distributed along the axial length of the liner. These liner reference characters and their functions will be described hereinafter in greater detail. As hereinbefore discussed, the apparent cause of smoke in a combustion chamber is primarily due to rich fuel regions in the front end of the combustion chamber. The fuel rich regions are caused by the inability to mix the fuel and available air uniformly and the inability to provide sufficient air to the primary zone, especially at the burner-can center near the fuel ejector. Attempts to provide the necessary mixing, by increasing the pressure drop and/or opening the air access holes, do not produce satisfactory results. For a large increase in air admission through the air access holes and/or large increases in the burner pressure drop, a low smoke level may be achieved, but at the expense of other performance parameters which make the combustion chamber unacceptable for engine use. If more moderate amounts of air and/or increase in pressure loss are used in order to retain the required level in all other performance parameters, it is found that smoke reduction achieved is marginal and not satisfactory. It has, therefore, been determined that the location, size and design of the front end air admission ports is a critical factor in a combustion chamber where it is desired to reduce the smoke level and maintain satisfactory performance parameters for use in a gas turbine engine.

In the embodiment shown in FIGS. 1 and 2, air to improve mixing and thereby eliminate the local fuel rich regions thus reducing carbon formation is added through a plurality of air tubes further upstream, that is, slightly downstream of or immediately adjacent the fuel nozzle. These air tubes with their appropriate reference characters will hereinafter be described. As illustrated in FIG. 1, the upstream end of the combustion chamber 4 includes dome-shaped member 20, include outer wall member 60 and inner wall member 62. For the sake of convenience, the inner wall designation will designate the wall closest to the burner centerline 64. Therefore, inner wall 62 of dome-shaped member 20 supports air tubes 66 while outer wall 60 supports air tubes 68, these air tubes assisting in eliminating local fuel rich regions. As illustrated, air tubes 66 and 68 are mounted on the inner and outer wall adjacent or slightly downstream of the fuel nozzles and are generally positioned circumferentially on liner 22 inner wall member 62 and outer wall member 60.

In the embodiment herein illustrated air tubes 66 and 68 extending from the dome member inner and outer walls 62 and 60 respectively, do so radially so as to provide a positive direction to the airflow issuing from the air tubes. As can be seen, the positive direction is radially inward, the extension or depth of the air tubes assisting in causing the air to penetrate further in towards the swirler centerlines 63. Air tubes 66 and 68 provide the means for counteracting the effects of the air entering through swirler 40 which would tend to deflect any air entering through openings in wall members 60 and 62. Air tubes 66 and 68 by directing the flow radially inward because of their shape, protect the air jet issuing therefrom from being dispersed by the air entering through swirler 40. This air entering air tubes 66 and 68 is able to penetrate past the swirler and cooling air hence permitting this air from air tubes to move toward the center end of the burner liner and combine with the swirler air to form an individual recirculation zone 74, as shown, one being associated with each fuel nozzle in the combustion chamber. To assist in forming recirculation zone 74, the axial position of the air tubes on the dome inner wall 62 and the dome outer wall 60 are critical. More specifically, air tubes 68 on the dome outer wall 60 are further downstream or axially offset from the upstream end of the burner liner than the axial position of air tubes 66 on the dome inner wall 62. The axial offset assists in establishing recirculation zone 74, which is formed primarily by the combination of the radially inward flowing air from the air tubes and the swirler air. As a result of the axial offset and the radial extension or depth of air tubes 66 and 68, the individual recirculation zones are located at a point much closer to the head or closed end of the combustion chamber than is normally possible. The result of locating this recirculation zone at a further upstream position is to permit the air to be available to mix with the incoming flow from fuel nozzles 16 sooner than is the case with other prior art constructions.

As hereinbefore stated, the amount of air entering through these air tubes is critical. It was further stated that the amount of air entering through these tubes for the configuration shown must be within the range of 6 to 8 percent, a preferred amount being approximately 7 percent of the total [primary combustion] airflow. Additionally, while not only is the amount of air flowing through the air tubes critical but also the amount of air flowing through the air tubes as positioned on the dome inner and outer walls is critical. Referring to FIG. 2, it can be seen that there is one air tube 66 attached to the dome inner wall for each individual fuel nozzle and hence recirculation zone 74. It is critical that there be at least one tube positioned on the dome inner wall for each nozzle. Alternatively, several tubes with an equivalent flow area, hereinafter described, may be utilized on the inner wall 62. The number of air tubes 68 in the dome outer wall are also critical; however, it has been determined that there be at least three but not more than four air tubes 68 to provide the required airflow into the individual combustion zones. Again, as with the inner wall air tubes, several more may be used so long as the critical flow requirements are satisfied.

To provide the required airflow through the air tubes for the configuration shown it has been found that air tube 66 on dome inner wall 62 should have an inside diameter or opening through which the air flows in the range of from 0.175 inch to 0.400 inch, and should be inserted into the burner liner a depth of 0.05 to 0.150 inch. The air tubes on the dome outer wall 60 should have an inside diameter or opening through which the air flows in the range of 0.200 to 0.425 inch and should be inserted radially to a depth of about 0.050 to 0.150 inch.

We claim:

1. A combustion chamber comprising a housing, a liner supported by the housing and spaced radially therefrom, the liner having a substantially closed end and an open end spaced axially therefrom with a first wall means therebetween, the first wall means having a plurality of openings along its axial length, the liner providing a zone for combustion of a fuel-air mixture, the combustion products being discharged through the open end, and fuel nozzle means positioned at the closed end of the liner for supplying fuel to the combustion zone wherein the improvement comprises:

said fuel nozzle means including a plurality of fuel nozzles, swirl vanes surrounding each fuel nozzle, the closed end of the liner having a central opening therein, inner wall means extending from the edge of said opening into said liner, said fuel nozzles being located in said closed end spaced around said inner wall means, air tube means positioned in said inner wall means and said first wall means downstream of each fuel nozzle and being substantially in axial alignment with the cooperating swirl vanes of the nozzle to direct air into the swirling air from the swirl vanes and the fuel from the fuel nozzle, and said air tube means and said swirl vanes forming a recirculation zone therebetween.

2. A combustion chamber as set forth in claim 1 wherein:

said air tube means including first air tubes and second air tubes, said first air tubes being positioned in the inner wall means to direct air from the central opening towards said first wall means, said second air tubes being positioned in said first wall means for directing air from around the liner towards inner wall means, and said flow of air from said first and second air tubes being directed into swirling airflow from the swirl vanes surrounding each fuel nozzle.

3. A combustion chamber as set forth in claim 2 wherein:

there are at least three but not more than four air tubes in said first wall means downstream of each fuel nozzle.

4. A combustion chamber as set forth in claim 2 wherein:

there is one air tube in the inner wall means downstream of each fuel nozzle.

5. A combustion chamber as set forth in claim 2 wherein:

there are at least three but not more than four air tubes in said first wall means downstream of each fuel nozzle, and there is one air tube in the inner wall means downstream of each fuel nozzle.

6. A combustion chamber as set forth in claim 2 wherein:

the openings of the air tubes downstream of each fuel nozzle are radially opposed and axially offset with respect to the combustion zone, the openings of the second air tubes on the first wall means being further downstream than the opening of the first air tube on the inner wall means.

* * * * *